United States Patent [19]

Braud

[11] Patent Number: 4,779,371

[45] Date of Patent: Oct. 25, 1988

[54] ICE FISHING DEVICE

[76] Inventor: David V. Braud, Rt. 1, Box 79, Battle Lake, Minn. 56515

[21] Appl. No.: 136,950

[22] Filed: Dec. 23, 1987

[51] Int. Cl.⁴ ............................................. A01K 97/10
[52] U.S. Cl. ..................................................... 43/19.2
[58] Field of Search ................................. 43/19.2, 26.1

[56] References Cited

U.S. PATENT DOCUMENTS

| | | |
|---|---|---|
| 3,550,302 | 12/1970 | Creviston et al. .................... 43/19.2 |
| 3,568,352 | 3/1971 | Hill ....................................... 43/19.2 |
| 4,197,668 | 4/1980 | McKinsey ............................. 43/15 |
| 4,597,215 | 7/1986 | Otremba ............................... 43/19.2 |

Primary Examiner—M. Jordan
Attorney, Agent, or Firm—Herman H. Bains

[57] ABSTRACT

An ice fishing device for jigging a fishing line includes a support having a housing attached to its upper end. An electric motor having an output shaft is positioned within the housing and a cam disc is secured to the output shaft of the electric motor. A cam element for the cam disc engages a socket member pivotally mounted on the housing. A reel having a fishing line wound thereon is mounted on the support, and the fishing line is supported by a rod which projects into the socket member. A switch assembly is actuated by the reel and energizes a signal light when the reel is unwound by a pulling force. The cam element on the cam disc imparts a vertical jigging movement to the socket member and rod when the electric motor is energized.

4 Claims, 1 Drawing Sheet

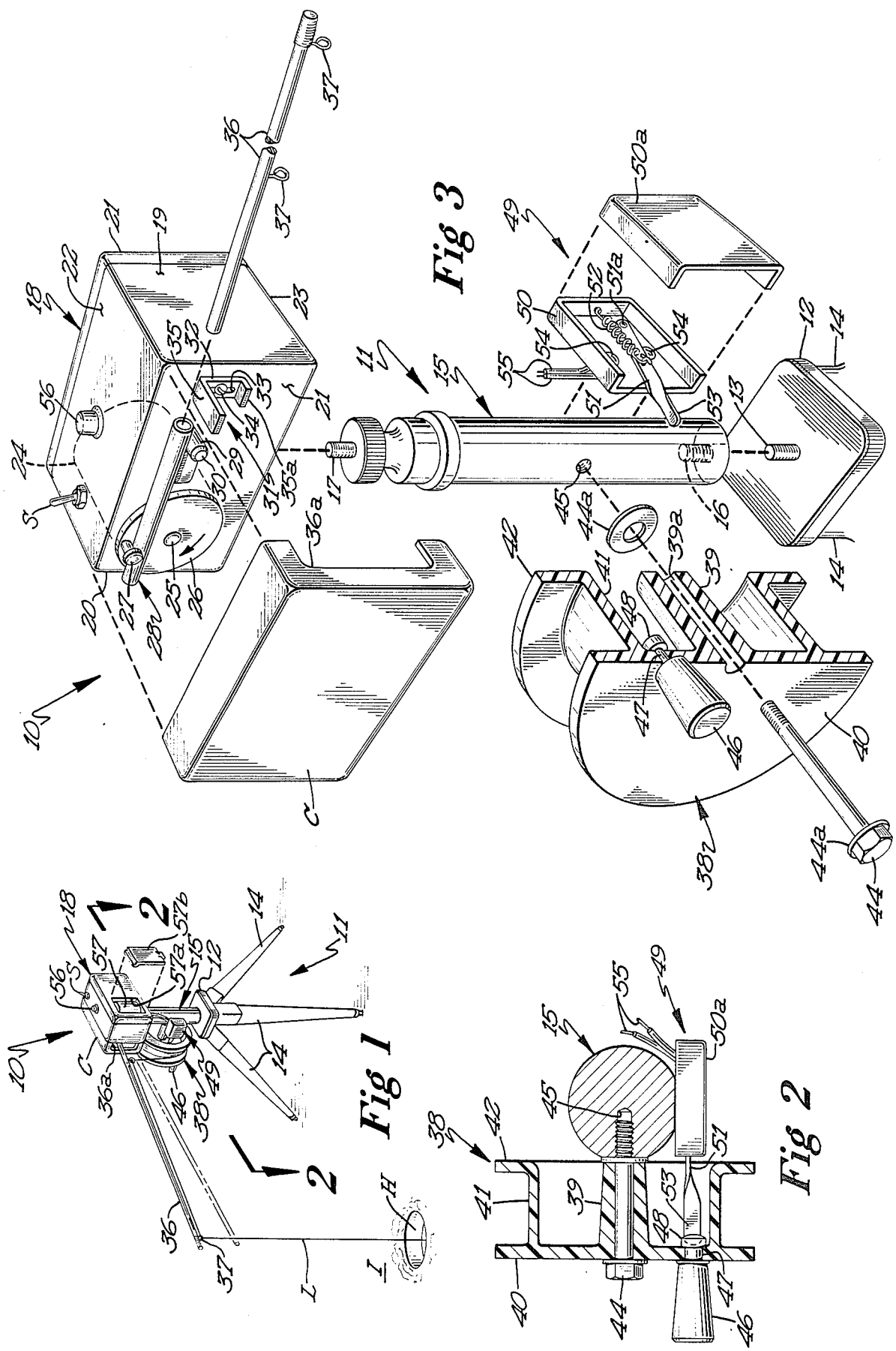

ICE FISHING DEVICE

This invention relates to a device for mechanically jigging a fishing line.

BACKGROUND OF THE INVENTION

Sportsmen, who participate in ice fishing, impart a jigging action to the line, which extends through an opening in the ice surface. Often times, a fisherman will have more than one opening in the ice surface through which he or she fishes. Usually, the distance between these holes or openings in the ice is of a magnitude which allows the fisherman to jig only one line at a time. Experience has shown that the jigging action of the bait or line attracts fish.

SUMMARY OF THE INVENTION

It is an object of this invention to provide a novel device, of simple and inexpensive construction, which is operable for jigging a fishing line and is especially adaptable for ice fishing.

Another object of this invention is the provision of an ice fishing device, which includes a socket member for holding a jigging rod, and which is pivoted about its axis by a motor driven cam to impart jigging action to the socket member and rod.

A further object of this invention is to provide a novel ice fishing device, which imparts a jigging action to a fishing line, and which is provided with a signal device for producing a visual signal when the fishing line is pulled by a fish and is unwound from the reel.

FIGURES OF THE DRAWING

FIG. 1 is a perspective view of the novel fishing device, illustrating its manner of use;

FIG. 2 is an exploded perspective view of the device, with certain parts thereof broken away for clarity; and FIG. 3 is a cross-sectional view taken approximately along the line 3—3 of FIG. 1 and looking in the direction of the arrows.

DESCRIPTION OF THE PREFERRED EMBODIMENT

Referring now to the drawings, it will be seen that one embodiment of the novel ice fishing device, designated generally by the reference numeral 10, is thereshown. In FIG. 1, the ice fishing device is illustrated in supported relation upon a sheet of ice I, which typically covers a frozen lake, and which has a hole H therein through which the ice fisherman fishes. The ice fishing device 10 includes a tripod support 11 comprised of an elongate, vertically disposed lower tripod support member 12, having a threaded male connector element 13 affixed to the upper end and projecting upwardly therefrom. The lower end of the lower support member 12 is provided with legs 14, which are adapted to support the fishing device 10 upon the sheet of ice I adjacent the hole H.

The tripod support 11 also includes an elongate generally cylindrical-shaped upper tripod support member 15 having a downwardly facing internally threaded female socket 16 therein, which engages the threaded male socket element 13 of the lower support member 12. The upper end of the upper tripod support member 15 is provided with a threaded male element 17, which projects upwardly therefrom. The threaded male element 17 passes through an opening 18a in a generally rectangular-shaped housing 18 and is secured to the housing by a nut in a conventional manner. The housing may be made of a suitable rigid material, such as plastic, metal, or the like. The rectangular-shaped housing 18 includes a front wall 19, a rear wall 20, side walls 21, a top wall 22, and a bottom wall 23. The bottom wall 23 is provided with the opening 18a through which the threaded male element 17 extends. One of the side walls 21 is a snap-on type wall and frictionally engages the top, rear, and bottom walls to provide an access door to the interior of the housing.

A constant speed D.C. electric motor 24 is positioned within the housing 18 and has an output shaft 25, which projects exteriorly through an opening in one of the side walls 21. A cam disc 26 is rigidly secured to the output shaft 25 and is provided with a cam element 27. One end portion of an elongate tubular socket member 28 is secured to the side wall 21 and the housing 18 by a pivot 30, which extends through sleeve 29. It will, therefore, be seen that the socket member 28 can pivot vertically about a horizontal transverse axis defined by the pivot 30.

An adjustable stop member 31 is secured to the side wall 21 of the housing 18 forwardly of the socket member 28. The adjustable stop member 31 includes a substantially flat vertical element 32 having a vertically extending elongate slot 33 therein through which a bolt 34 projects and threadedly engages a threaded opening in the side wall 21. The bolt 34 clamps the adjustable stop member to the side wall 21 and cooperates with the slot 33 to permit vertical adjustment of the stop member relative to the side wall. The stop member 31 has an upper horizontal arm 35 and a lower horizontal arm 35a integral with the vertical element and each projecting outwardly therefrom.

One end of an elongate jigging rod 36 projects into the socket member and projects outwardly therefrom. It will be seen that, when the electric motor 24 is energized, the cam disc will be rotated in the direction indicated by the directional arrow so that the cam element 27 successively moves the socket member 28 in a direction to move the outer end of the rod 36 upwardly until the rod engages the horizontal arm 35 of the stop member 31. It will be noted that the forward location of the pivot 30 for the socket member 28 causes the rear end portion of the socket member to swing upwardly by action of gravity when it is not urged downwardly by the cam element 27. Therefore, when the cam element disengages from the socket member, the socket member will normally swing to move the outer end of the rod 36 in a downward direction. With this arrangement, the socket member and rod will be moved in a constant up and down motion.

It will be seen that a pair of loop-shaped line supports 37 are secured to the inner and outer end portions of the rod 36 in a well-known manner. A reel 38 is mounted on the upper tripod support member 15 intermediate the ends thereof, and the reel 38 includes a sleeve-type hub 39 having a circular or disc-shaped plate 40 integrally formed with one end thereof and extending radially outwardly therefrom. A generally cylindrically-shaped reel element 41 is integrally formed with the plate 40 and projects axially therefrom, as best seen in FIG. 2. An outturned radially extending flange 43 is integrally formed with the inner end of the cylindrical reel element 41 and projects radially outwardly therefrom. The shaft of a bolt 44 projects through an opening 39a in the sleeve hub 39 and through openings in the upper tripod support member 15 and is secured thereto by a suitable nut which engages the threaded end of the bolt. The reel 38 is journaled on the bolt for rotation relative thereto. A line L is wound about the reel and extends through the loop-shaped line supports 37 on the rod 36. The end of the line will be provided with a lure or a hook to which the bait may be secured.

The reel 38 is provided with a handle 46, which is used to wind and unwind the line L. The handle is secured to plate 40 by a bolt 47 which engages a threaded opening in the handle 46. The bolt 47 is provided with a head 48, which is positioned interiorly of the cylindrical reel element 41.

A switch assembly 49 is mounted on the upper tripod support member 15 and includes a housing 50, which is secured to the upper support member 15 by suitable bolts or the like. One end of an elongate arm 51 is positioned within the housing and is pivoted thereto by a pivot 51a. The other end portion 53 of the arm projects exteriorly of the housing and interiorly of the cylindrical reel element 41. The end portion 53 of the arm 51 is disposed in obstructing relation with respect to the bolt head 48 so that, if the reel 38 is rotated, the bolt head will engage and pivot the arm 51 in an upward direction. One end of spring 52 is connected to the arm and the other end thereof is connected to the end wall of the housing 50 to normally urge the arm 51 to a horizontal level position. The housing 50 is provided with a cover 50a which cooperates with the housing for closing the interior of the latter from the exterior.

The housing 50 is provided with a pair of contacts 54, which are vertically spaced apart and are positioned on opposite sides of the arm 51. The contacts are connected by suitable conductors 55 to batteries 57 positioned within the compartment 37a in the housing 18 and which supply current to the motor 24. A removable cover 37b is provided on the removable side 21 to provide access to the battery compartment. A signal light 56 mounted on the housing 18 is also connected in the circuit of the switch assembly 49. With this arrangement, when the arm 51 is moved upwardly or downwardly in response to rotation of the reel 38, the switch arm will engage one of the contacts 54 and thereby energize the switch circuit and cause the signal light 56 to turn on. It will, therefore, be seen that, when a fish pulls the line 38a with a sufficient force to rotate the reel 38, the signal light 56 will be turned on, thereby apprising the fisherman that a fish is on the line. The housing 18 is provided with a snapon side cover C for enclosing the cam disc 26, tubular socket member 28, and adjustable stop 31. The cover C, which is of rectangular configuration with inturned flanges, has a forwardly opening slot 36a therein through which the rod 36 projects. The cover C may be removed to provide access to the cam disc, socket member, or adjustable stop.

In use, the ice fishing device 10 will be positioned upon the sheet of ice I adjacent the fishing hole H so that the fishing line 38a extends downwardly into the opening or hole H. An on-off control switch S is provided for selectively energizing the electric motor 24. The motor will be energized to rotate the cam disc 26 and cam element 27, whereby the latter will engage and urge the rear end portion of the socket member 28 downwardly and the front end portion of the rod 36 upwardly. After the cam element 27 disengages the socket member, the rear portion of the latter will again move upwardly by action of gravity, producing a downward movement of the front end of the rod 36. This jigging motion will continue until the motor 24 is deenergized, or until a fish pulls on the line 38. This pulling motion of the line L will cause the reel 38 to rotate so as to unwind the line L and thereby cause the head 48a of the bolt 47 to pivot the switch arm 51 downwardly against the lower contact, thereby energizing the circuit to the signal light 56. Thus, the signal light will flicker on and off and will give a visual signal to the fisherman. The fisherman may then reel the fish in and reinsert the line through the opening H.

From the foregoing, it will be seen that I have provided an ice fishing device 10, which may be used to continuously and automatically jig a fishing rod while the fisherman is manually jigging, or mechanically jigging, another fishing line. The ice fishing device can be readily disassembled or reassembled with a minimum of effort and in a minimum of time. When the device is in a disassembled condition, it may be readily stored in an area of small compass.

Thus, it will be seen that I have provided a novel ice fishing device, which is not only of simple and inexpensive construction, but one which functions in a more efficient manner than any heretofore known comparable device.

What is claimed is:

1. An ice fishing device for jigging a fishing line which ends through an opening in an ice surface, comprising:

a support engaging the ice surface and extending upwardly therefrom, a housing attached to said support and spaced above the surface of the ice and opening therein, an elongate socket member, means pivotally connecting one end portion of said socket member to the housing for vertical pivotal movement of the socket member about a horizontal axis, said socket member being normally urged by gravity to an inclined position, an elongate rod having one end thereof projecting into said socket member and extending longitudinally therefrom, adjustable stop means on said housing positioned in obstructing relation with respect to said rod to limit downward movement of the latter during pivotal movement of said socket member, a reel on said support having an elongate fishing line wound thereon, said fishing line having one end portion supported by the outer end of said rod and adapted to depend therefrom through the opening in the ice surface into the water, an electric motor in said housing connected to a source of electric power and having an output shaft, an actuating cam disc positioned exteriorly of said housing and being mounted on said output shaft for revolving movement with the latter, a cam element of said disc adjacent the periphery thereof and projecting axially therefrom into obstructing relation with respect to said socket member whereby, when the electric motor is energized, said cam disc will be rotated and said cam element will successively engage said socket member to pivot the latter about its pivotal axis and produce a vertical jigging action of the rod and fishing line.

2. The ice fishing device as defined in claim 1 and a switch circuit including a switch assembly mounted on said support and including a switch arm, said switch circuit including a signal light on said housing, means on said reel engaging said switch arm to urge the latter from a normally open position to a closed position when the reel is rotated in response to a pulling force exerted on the fishing line to thereby energize said signal light.

3. The ice fishing device as defined in claim 1 wherein said adjustable stop is positioned forwardly of said socket member and is vertically adjustable relative to said housing.

4. The ice fishing device as defined in claim 1 wherein said elongate socket member extends in a fore and aft direction, said cam element on said cam disc engaging the lower rear end portion of said socket member during rotation of said disc to raise the rear end portion of the socket member and lower the outer end portion of the rod before the cam element is moved out of engaging relation with respect to said socket member.

* * * * *